(12) United States Patent
Wintrich et al.

(10) Patent No.: US 7,231,078 B2
(45) Date of Patent: Jun. 12, 2007

(54) METHOD FOR MONITORING A THERMODYNAMIC PROCESS

(75) Inventors: Franz Wintrich, Essen (DE); Volker Stephan, Hüpstedt (DE)

(73) Assignee: Powitec Intelligent Technologies GmbH, Essen (DE)

( * ) Notice: Subject to any disclaimer, the term of this patent is extended or adjusted under 35 U.S.C. 154(b) by 119 days.

(21) Appl. No.: 11/057,964

(22) Filed: Feb. 15, 2005

(65) Prior Publication Data

US 2005/0147288 A1 Jul. 7, 2005

Related U.S. Application Data

(63) Continuation of application No. PCT/EP03/002582, filed on Mar. 13, 2003.

(30) Foreign Application Priority Data

Aug. 16, 2002 (EP) ................. 02018427

(51) Int. Cl.
G06K 9/00 (2006.01)
(52) U.S. Cl. ..................... 382/141; 382/276
(58) Field of Classification Search ............ 382/110, 382/141, 152, 156, 181, 276, 284; 431/12; 700/274

See application file for complete search history.

(56) References Cited

U.S. PATENT DOCUMENTS

| | | | |
|---|---|---|---|
| 5,971,747 A | 10/1999 | Lemelson et al. | |
| 5,993,194 A * | 11/1999 | Lemelson et al. | 431/14 |
| 6,278,374 B1 | 8/2001 | Ganeshan | |
| 2001/0014436 A1 | 8/2001 | Lemelson et al. | |
| 2004/0044423 A1 | 3/2004 | Wintrich et al. | |
| 2004/0214123 A1 | 10/2004 | Schmidt et al. | |

FOREIGN PATENT DOCUMENTS

DE 197 10 206 A1 9/1998

OTHER PUBLICATIONS

Bo Baek, et al "Flame image processing & analysis for optimal coal firing plant of thermal power plant", IEEE, pp. 928-931, 2001.*
Bertucco L et al., "A Cellular Neural Networks Approach to Flame Image Analysis for Combustion Monitoring", pp. 455-459, 2000 6th IEEE International Workshop on Cellular Networks and Their Applications Proceedings.
Niemi A J et al., "Image Analysis and Vision Systems for Process Plants", pp. 11-20, Intelligent Processing and Manufacturing of Materials, 1999, IPMM '99, Proceedings of the Second International Conference on Honolulu, HI, USA, Jul. 10-15, 1999, Piscataway, NJ, USA, IEEE.
Sbarbaro D et al., "Monitoring and Characterization of Combustion Flames By Generalized Hebbian Learning", Proceedings of the 2002 International Joint Conference on Neural Networks, IJCNN '02, Honolulu, Hawaii, May 12-17, 2002, International Joint Conference on Neural Networks, New York, NY: IEEE, USA, vol. 1 of 3, pp. 82-85.
Translation of International Preliminary Examination Report, which is for International Application No. PCT/EP2003/002582 and has a mailing date of Apr. 7, 2005.

* cited by examiner

*Primary Examiner*—Daniel Miriam
(74) *Attorney, Agent, or Firm*—Womble Carlyle Sandridge & Rice, PLLC

(57) ABSTRACT

In a method for monitoring a thermodynamic process in an installation, in which image material (5) of the process is produced and the image material (5) is subjected to image evaluation, an eigen value problem approach is used, at least in large part, for automatic image evaluation.

31 Claims, 2 Drawing Sheets

METHOD FOR MONITORING A THERMODYNAMIC PROCESS

CROSS-REFERENCE TO RELATED APPLICATION

The application is a continuation of International Application PCT/EP2003/002582, which designates the U.S., was filed Mar. 13, 2003, and is incorporated herein by reference in its entirety.

TECHNICAL FIELD

The present invention relates to a method for monitoring a thermodynamic process in an installation, in which images of the process are produced and subjected to image evaluation.

BACKGROUND OF THE INVENTION

In a known method for monitoring a thermodynamic process in an installation, in which images of the process are produced and subjected to image evaluation, first specific features for image evaluation are defined which appear to be promising to the operator of the installation for modeling the process. For example, one defines specific moments and then reproduces the image material on this, necessarily reduced, system of functions. The selected features, and only these, are then examined and used for creating a process model. Optionally, only parts of the information contained in the image material are extracted and used.

BRIEF SUMMARY OF SOME ASPECTS OF THE INVENTION

The present invention is based on the object of providing improvements with regard to the monitoring a thermodynamic process, in which images of the process are produced and subjected to image evaluation. In accordance with one aspect of the present invention, an eigen value problem approach is used in an automatic evaluation of the images.

Since the image evaluation is based on an eigen value problem approach, at least for the largest part of the high-dimensional image space, the information contained in the images can be transformed into a lower-dimensional space for evaluation, without any significant loss of information. The images are then represented by means of characteristic image features resulting from the eigen value problem. These characteristic image features can be referred to as "eigen flames" (e.g., eigenvectors that represent a flame). Image evaluation is done automatically, the evaluation approach being intrinsic to the system and not depending on features selected by the operator of the installation. Preferably, singular events which may significantly impair the process are taken into account for solving the eigen value problem, so that they can be identified more quickly in subsequent image evaluations.

A typical thermodynamic process serves to transform material, the necessary temperature being generated and maintained by a combustion process having at least one flame. Simultaneous capture of the flame and the material (e.g., the material which is to be transformed and/or is being transformed and/or has been transformed) in the image material (e.g., simultaneous capture of radiation emitted by the flame and the material in a common frame) has the advantage of providing information on the interaction between the flame and the material in a unique manner. It is then possible to subject the description of one entire scene to image evaluation. The environment of the flame is preferably complemented by also capturing the walls of the combustion chamber, i.e. their emissions.

BRIEF DESCRIPTION OF THE DRAWINGS

The invention is explained in greater detail below by means of three exemplary embodiments illustrated in the drawings, in which.

DETAILED DESCRIPTION OF THE INVENTION

Figure 1:
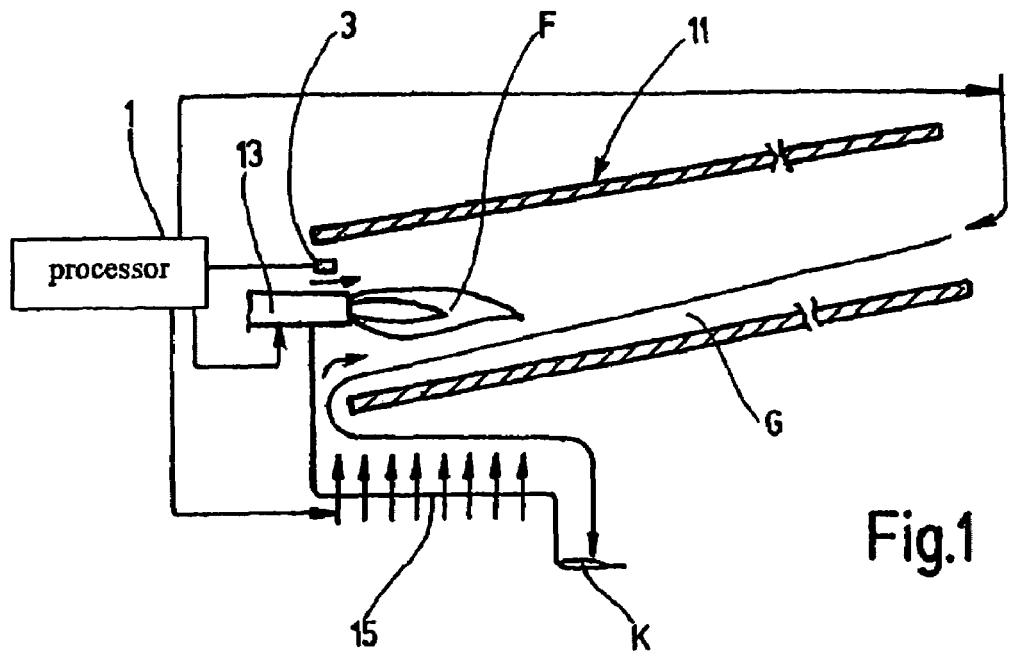
FIG. 1 is a schematic, partially sectional view, of an installation for producing cement according to a first exemplary embodiment.
Figure 2:
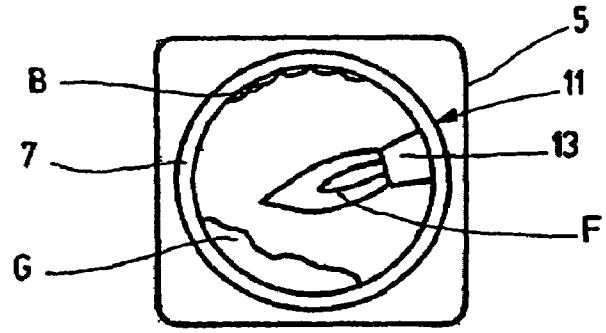
FIG. 2 is a simplified camera image of the installation in FIG. 1.
Figure 3:
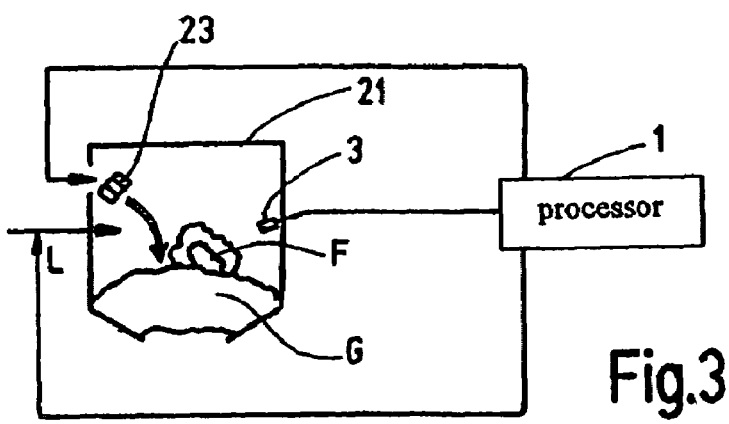
FIG. 3 is a schematic representation of a garbage incinerator installation according to a second exemplary embodiment.
Figure 4:
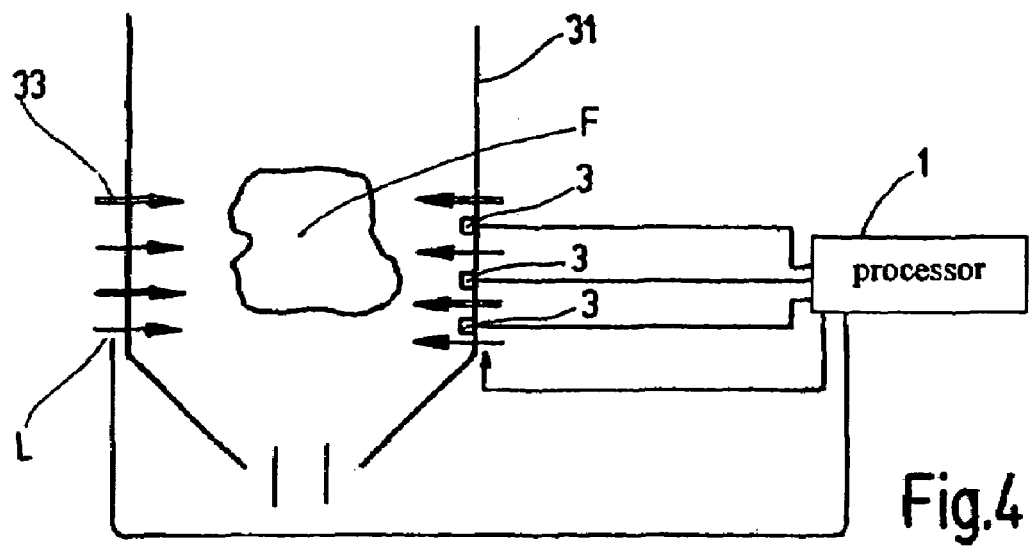
FIG. 4 is a schematic representation of a power plant furnace installation that has been longitudinally sectioned, according to a third exemplary embodiment.
Figure 5:
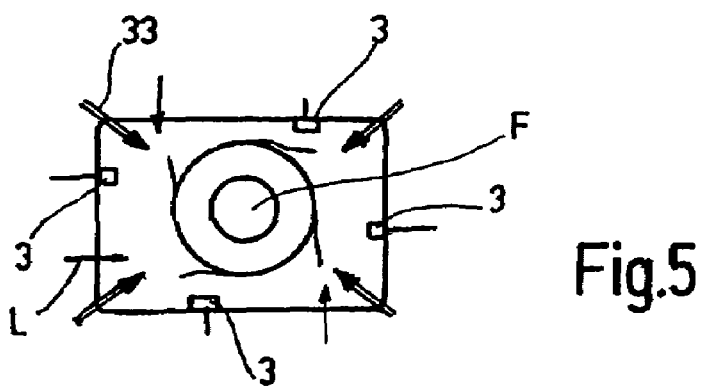
FIG. 5 is a corresponding horizontal transverse section of the installation of FIG. 4.
Figure 6:
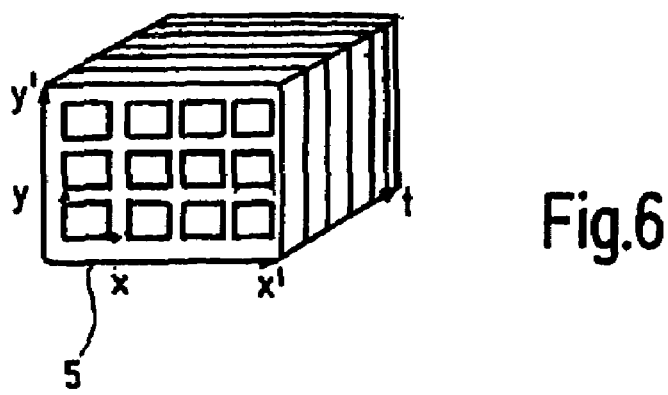
FIG. 6 is a schematic representation of the image material in the third exemplary embodiment.

In all three exemplary embodiments, a thermodynamic process runs in an installation, in which, at least partially, combustible material G is subjected to oxidation by the adduction of air L, there being at least one flame F. The thermodynamic process is to be monitored and then regulated in such a way as to have, on the on the one hand, a certain stability and, on the other hand, a certain flexibility, i.e. adapting itself to different conditions, there being certain optimization goals. The condition in the installation is described by different process parameters, some of which are also control parameters. By actions, i.e. by changing control parameters, the condition of the installation is modified. For online monitoring and control as well as forecasts of future conditions of the installation, a neural network is implemented in a data processing unit 1.

By means of at least one camera 3, images of the thermodynamic process are captured. The camera 3 is set in such a way that it captures both the flame F and the burning material G, preferably also the walls 7 of the combustion chamber including caking B, if applicable, i.e. the emissions from the entire environment. The image material 5 produced by the camera 3 thus contains the description of one entire scene also including the interaction between the flame F and the material G. The image material 5 is fed into a data processing unit 1, whereby, on the one hand, a live video image is displayed and, on the other hand, some process parameters are computed from the information contained in the image material 5.

In order to process the information in the image material 5 in an intelligent way without loss of information, i.e. due to its complexity in order to transform it first into a low-dimensional space, one selects, at least in large part, an eigen value problem for an approach, i.e. one attempts a kind of principal component analysis. Each image is then described by a (usually) small number of scalar eigen values (mostly fewer than 20, for example eight), i.e. of transformed coordinates in the new coordinate system, and of vectorial eigen images or eigen flames, i.e. by coordinate axes for the new coordinate system, the eigen flames with the highest values dominating according to the system. The term of eigen flames must be interpreted in a large sense, since the emissions are not only included from the flame F, but also from the material G.

In a classical principal component analysis, the zero digits of the characteristic polynom of the co-variance matrix would have to be calculated. In order to maintain the system of orthonormal eigen flames, one can alternatively use a stochastic approximation method in a neural network, first randomly initializing the weightings of all neurons and then, using the image material, iteratively first adapting the weightings of the first neuron, the second neuron, etc.

The eigen flames show up mostly as compact regions, since adjacent pixels also monitor adjacent vectors of the combustion chamber whose light emissions are strongly correlated. In addition to some average luminosity distributions, singular events are also selected from the captured images as an eigen flame approach for the eigen value problem, for example a sudden adduction of new material G.

Using the process parameters to be computed by means of the (at least in large part solved) eigen value problem, a process model is created in the neural network, by means of which one can improve the precision of the forecasts. With this approach, any singular event can be quickly detected, so that different additional measurements can then be started in order to obtain more information on the present process status following the singular event.

Since the image evaluation no longer depends on a pre-determined selection of parameters, but itself extracts suitable information from the image material 5, the image evaluation can be automated. In addition, the risk of not factoring in relevant information contained in the image material 5 is clearly reduced. The simultaneous consideration of emissions from the material G in the image material 5 provides information which, in its interaction with the flame F, cannot be obtained in any other way. By means of the chosen approach using image material 5 captured at different intervals, the eigen value problem takes developments in time into account.

The first exemplary embodiment relates to a rotary kiln 11 for the production of cement, being operated in a well-known manner. The camera 3 is focused on the inside of the rotary kiln 11, capturing the image of the flame F of a burner 13, of the material being transformed G as well as of the walls 7 including caking B. The data processing unit 1 subjects the image material 5 from the camera 3 to the described eigen value approach. The neural network, in addition to the compressed data, also receives information on the mass flows of the air L adducted via different pathways, on the fuel and the material G. The optimization goal, on the one hand, is a high FCAO value (i.e., a conventional measure of the quality of cement) of the produced clinker K, said FCAO value being determined not only from the condition inside the rotary kiln 11, but also from the conditions on the cooling path 15. On the other hand, the mixture of the fuel is to be set in such a way that a maximum of secondary fuel, i.e. waste, is used up. Finally, the caking B on the walls 7 of the rotary kiln 11 are also to be kept at a minimum.

The second exemplary embodiment concerns a garbage incinerator 21. Here as well, the camera 3, preferably several cameras, capture the image of the flame F and material G as one common frame. In a special embodiment for hazardous waste incineration, garbage containers 23 containing hazardous waste are dumped into the garbage incinerator 21 a certain intervals. The burst of such a waste container 23, due to the high temperature, is a singular event which is quickly detected by means of the eigen value approach according to the invention. Several additional measurements can then be initiated, such as taking a sample, in order to obtain more information on the present process status following said singular event. Preferably, as soon as the door through which the garbage container 23 is dumped is opened, a high speed camera is started, providing additional image material 5 at shorter intervals, shortly before and after the singular event.

The third exemplary embodiment concerns a power plant in which, in addition to the air L, fuel 33, for example ground coal, is fed into a furnace 31 via the corners of the furnace 31, indicated by double arrows. A huge, rotary flame F forms inside the furnace 31. Several cameras 3 are arranged, for example, at three different levels on each side of the furnace 31. Each camera 3 captures the flame F as well as the adduction area for the fuel 33 in one scene, particularly the entry of the fuel 33 into the flame F providing interesting information, since, as a rule, for the fuel 33, as opposed to the air L, only the total mass flow from the coal grinder can be measured, but not the partial flows to the individual adduction areas. The image material 5 displays (i.e., includes) the two-dimensional x-y frames of the cameras 3 respectively combined into x'-y' instantaneous images at different times t, i.e. a three-dimensional field. The image material 5, which is thus (as in the other exemplary embodiments as well) quasi three-dimensional, is subjected to the described eigen value approach.

What is claimed is:

1. A method for monitoring a thermodynamic process in an installation, the method comprising:
    providing image material obtained from the process; and
    subjecting the image material to an automatic image evaluation that is at least substantially based upon an eigen value problem approach,
    wherein the providing of the image material includes simultaneously capturing in one common frame at least both
        (a) emissions from at least one flame of the thermodynamic process and
        (b) emissions from material to be transformed through the thermodynamic process, so that the image material includes the frame, the frame includes information about the emissions from the at least one flame, the frame further includes information about the emissions from the material to be transformed through the thermodynamic process, and the frame includes information about interaction between the at least one flame and the material to be transformed through the thermodynamic urocess, and
    wherein the subjecting of the image material to the automatic image evaluation includes subjecting the entire frame to the automatic image evaluation.

2. The method according to claim 1, wherein the providing of the image material further includes capturing emissions from walls of a combustion chamber of the installation.

3. The method according to claim 2, wherein the providing of the image material further includes:
    creating a combined image, with the creating of the combined image including instantaneously capturing emissions in a plurality of frames and arranging the plurality of frames into the combined image;
    creating a plurality of combined images, with the creating of the plurality of combined images including sequentially repeating the creating of the combined image at a plurality of different times so that the plurality of combined images respectively correspond to the plurality of different times, and creating a three-dimensional field, with the creating of the three-dimensional field including arranging the plurality of combined images in a time-dependent series.

4. The method according to claim 3, wherein the subjecting of the image material to the automatic image evaluation comprises:
subjecting the three-dimensional field to the automatic image evaluation.

5. The method according to claim 3, wherein the subjecting of the three-dimensional field to the automatic image evaluation comprises: representing the three-dimensional field by eigen flames and transformed coordinates.

6. The method according to claim 2, wherein the image material is at least substantially represented by eigen flames and transformed coordinates.

7. The method according to claim 1, wherein the providing of the image material further includes:
creating a combined image, with the creating of the combined image including instantaneously capturing emissions in a plurality of frames and arranging the plurality of frames into the combined image;
creating a plurality of combined images, with the creating of the plurality of combined images including sequentially repeating the creating of the combined image at a plurality of different times so that the plurality of combined images respectively correspond to the plurality of different times, and
creating a three-dimensional field, with the creating of the three-dimensional field including arranging the plurality of combined images in a time-dependent series.

8. The method according to claim 7, wherein the image material is at least substantially represented by eigen flames and transformed coordinates.

9. The method according to claim 8, further comprising selecting at least one singular event as an approach for eigen flames.

10. The method according to claim 7, wherein the installation in which the thermodynamic process takes place is a rotary kiln of a cement plant, a garbage incinerator, or a furnace of a power plant.

11. The method according to claim 7, wherein the subjecting of the image material to the automatic image evaluation includes determining process parameters via the automatic image evaluation, and the method further comprises:
comparing the process parameters to optimization targets, and
carrying out actions for regulating the process in response to the comparing of the process parameters to the optimization targets.

12. The method according to claim 7, wherein the instantaneously capturing of the emissions in the plurality of frames comprises:
using a plurality of cameras, which are spaced apart from one another, to respectively capture the emissions in the plurality of frames.

13. The method according to claim 1, wherein the image material is at least substantially represented by eigen flames and transformed coordinates.

14. The method according to claim 13, further comprising selecting at least one singular event as an approach for eigen flames.

15. The method according to claim 1, wherein the installation in which the thermodynamic process takes place is a rotary kiln of a cement plant, a garbage incinerator, or a furnace of a power plant.

16. The method according to claim 1, wherein the installation in which the thermodynamic process takes place is a garbage incinerator, the method further comprises selecting at least one singular event as an approach for eigen flames, and the singular event comprises bursting of a garbage container in the garbage incinerator.

17. The method according to claim 1, wherein:
the subjecting of the image material to the automatic image evaluation comprises representing the image material by eigen flames and transformed coordinates;
the subjecting of the entire frame to the automatic image evaluation comprises calculating the eigen flames; and
both the information about the emissions from the at least one flame and the information about the emissions from the material to be transformed through the thermodynamic process are included in the calculating of the eigen flames.

18. The method according to claim 1, wherein: the capturing of the emissions from the at least one flame comprises capturing an image of the at least one flame, so that the frame includes the image of the at least one flame, and
the capturing of the emissions from the material to be transformed through the thermodynamic process comprises capturing an image of the material to be transformed through the thermodynamic process, so that the frame includes the image of the material to be transformed through the thermodynamic process.

19. The method according to claim 18, wherein the capturing further comprises capturing an image of a wall of a combustion chamber of the installation, so that the frame includes the image of the wall of the combustion chamber.

20. The method according to claim 1, wherein the material, which is to be transformed through the thermodynamic process, comprises a solid material, so that:
the capturing of the emissions from the material to be transformed through the thermodynamic process comprises capturing emissions from the solid material to be transformed through the thermodynamic process;
the frame includes information about the emissions from the solid material to be transformed through the thermodynamic process, and
the frame includes information about interaction between the at least one flame and the solid material to be transformed through the thermodynamic process.

21. The method according to claim 20, wherein:
the capturing of the emissions from the at least one flame comprises capturing an image of the at least one flame, so that the frame includes the image of the at least one flame, and
the capturing of the emissions from the solid material to be transformed through the thermodynamic process comprises capturing an image of the solid material to be transformed through the thermodynamic process, so that the frame includes the image of the solid material to be transformed through the thermodynamic process.

22. The method according to claim 20, wherein solid material comprises coal.

23. The method according to claim 20, wherein solid material comprises garbage.

24. An apparatus for monitoring a thermodynamic process in an installation, wherein the thermodynamic process includes at least one flame and is for transforming material, the apparatus comprising:
at least one camera positioned
(a) for producing image material that includes one common frame in which a plurality of emissions have been simultaneously captured, with the plurality of emissions including at least both
(1) emissions from the at least one flame and
(2) emissions from the material to be transformed, and
(2) so that the frame includes information about the emissions from the at least one flame, the frame further includes information about the emissions from the material to be transformed through the thermodynamic process, and the frame includes information about interaction between the at least one flame and the material to be transformed through the thermodynamic process; and
a data processing unit for subjecting the image material to an automatic image evaluation that is at least substantially based upon an eigen value problem approach, with the data processing unit being operative so that the subjecting of the image material to the automatic image evaluation includes subjecting the entire frame to the automatic image evaluation.

25. The apparatus according to claim 24, wherein the data processing unit includes a neural network.

26. The apparatus according to claim 24, wherein the at least one camera is positioned so that the plurality of emissions further includes emissions from walls of a combustion chamber of the installation.

27. The apparatus according to claim 24, wherein the image material includes a three-dimensional field, and wherein the camera is one of a plurality of cameras that are cooperative for:
creating a combined image by instantaneously capturing emissions in a plurality of frames and arranging the plurality of frames into the combined image;
creating a plurality of combined images, with the creating of the plurality of combined images including sequentially repeating the creating of the combined image at a plurality of different times so that the plurality of combined images respectively correspond to the plurality of different times, and
creating the three-dimensional field, with the creating of the three-dimensional field including arranging the plurality of combined images in a time-dependent series.

28. The apparatus according to claim 24, wherein the data processing unit is operative so that the image material is at least substantially represented by eigen flames and transformed coordinates.

29. The apparatus of claim 24 in combination with the installation, wherein the installation is a rotary kiln of a cement plant, a garbage incinerator, or a furnace of a power plant.

30. The apparatus according to claim 29, wherein the image material includes a three-dimensional field, and wherein the camera is one of a plurality of cameras that are cooperative for:
creating a combined image by instantaneously capturing emissions in a plurality of frames and arranging the plurality of frames into the combined image;
creating a plurality of combined images, with the creating of the plurality of combined images including sequentially repeating the creating of the combined image at a plurality of different times so that the plurality of combined images respectively correspond to the plurality of different times, and
creating the three-dimensional field, with the creating of the three-dimensional field including arranging the plurality of combined images in a time-dependent series.

31. A method for monitoring a thermodynamic process in an installation, the method comprising:
providing image material obtained from the process; and
subjecting the image material to an automatic image evaluation that is at least substantially based upon an eigen value problem approach,
wherein the providing of the image material includes simultaneously capturing in one common frame at least both
(a) emissions from at least one flame of the thermodynamic process and
(b) emissions from material to be transformed through the thermodynamic process,
whereby the image material includes the frame,
wherein the subjecting of the image material to the automatic image evaluation includes subjecting the entire frame to the automatic image evaluation, and
wherein the installation in which the thermodynamic process takes place is a garbage incinerator, the method further comprises selecting at least one singular event as an approach for eigen flames, and the singular event comprises bursting of a garbage container in the garbage incinerator.

* * * * *

UNITED STATES PATENT AND TRADEMARK OFFICE
CERTIFICATE OF CORRECTION

PATENT NO. : 7,231,078 B2  
APPLICATION NO. : 11/057964  
DATED : June 12, 2007  
INVENTOR(S) : Franz Wintrich et al.

It is certified that error appears in the above-identified patent and that said Letters Patent is hereby corrected as shown below:

In the claims:

Col. 4 Claim 1, line 21, change "urocess" to --process--.

Col. 6 Claim 24, line 13, change "(2)" to --(b)--.

Signed and Sealed this

Thirty-first Day of July, 2007

JON W. DUDAS  
*Director of the United States Patent and Trademark Office*